A. H. TRAEGER.
COMBINED VARIABLE SPEED, CLUTCH, AND FREE WHEEL DEVICE FOR MOTORCYCLES.
APPLICATION FILED MAR. 16, 1920.
1,390,065.
Patented Sept. 6, 1921.
2 SHEETS—SHEET 1.
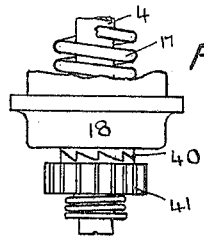
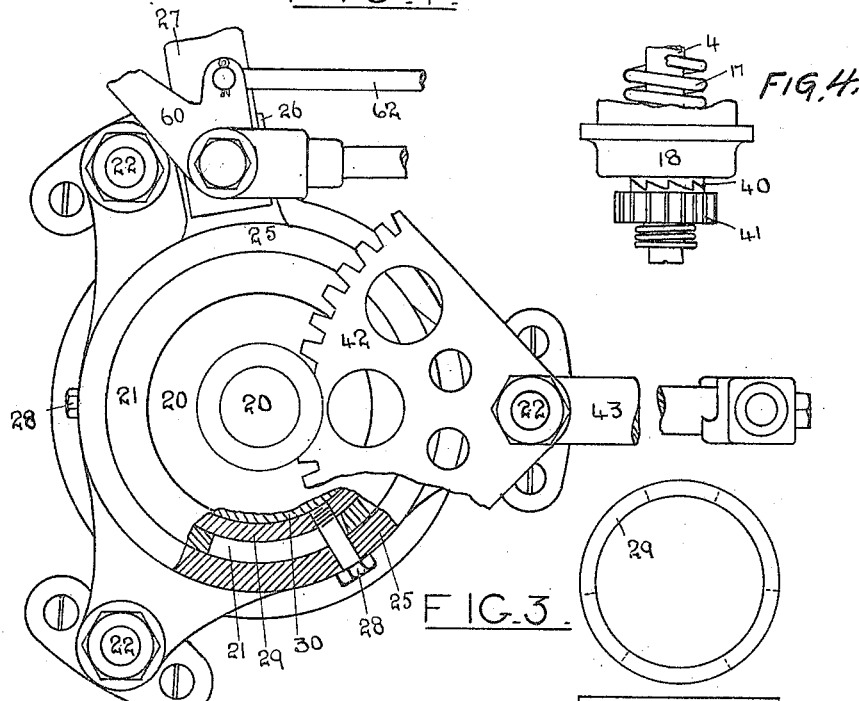
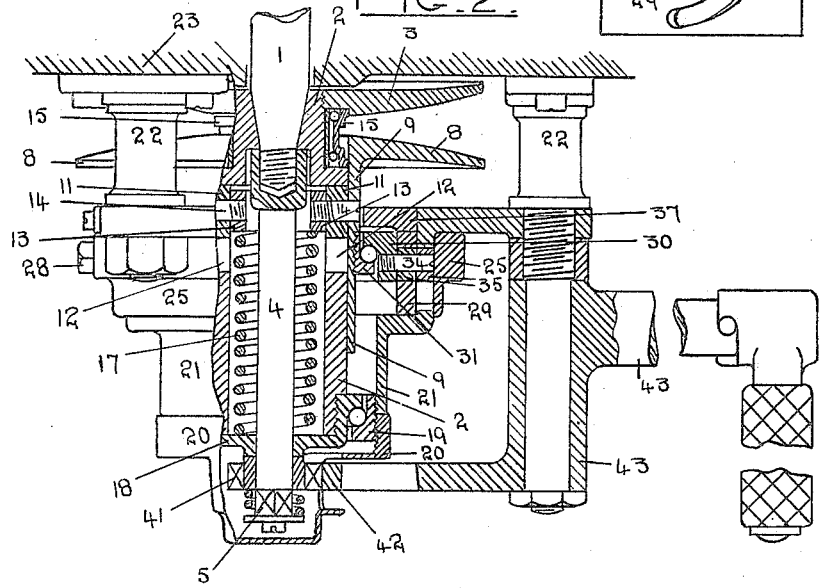

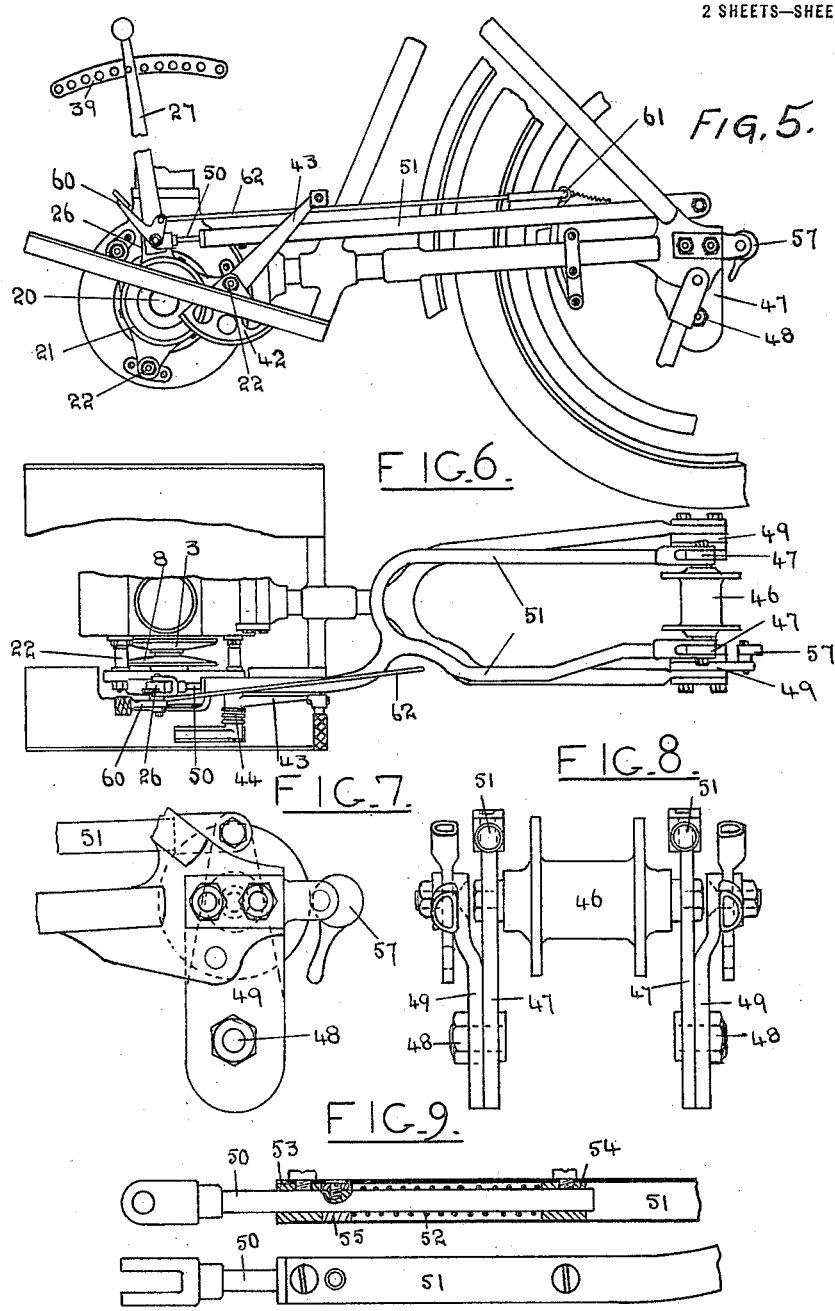

UNITED STATES PATENT OFFICE.

ALFRED HERMAN TRAEGER, OF KENSINGTON GARDENS, SOUTH AUSTRALIA, AUSTRALIA.

COMBINED VARIABLE-SPEED, CLUTCH, AND FREE-WHEEL DEVICE FOR MOTORCYCLES.

1,390,065. Specification of Letters Patent. Patented Sept. 6, 1921.

Application filed March 16, 1920. Serial No. 366,326.

*To all whom it may concern:*

Be it known that I, ALFRED HERMAN TRAEGER, a subject of the King of Great Britain and Ireland, residing at Brigalow Avenue, Kensington Gardens, State of South Australia, Commonwealth of Australia, have invented a certain new and useful Combined Variable-Speed, Clutch, and Free-Wheel Device for Motorcycles, of which the following is a specification.

This invention relates to a combined variable speed clutch, and free wheel device for motor cycles.

Essentially my invention comprises a variable or expanding V pulley secured on the engine shaft but having a loose ring at the bottom of the groove, such pulley being connected by a belt to a rigid or non-expanding V pulley secured to the rear or driving wheel of the cycle, the axle of which rear wheel is carried in plates movable toward or from the variable pulley, the expanding V pulley being operated by a control lever with a connection also to the plates carrying the axle of the rear wheel.

I am aware that expanding V pulley variable speed devices have been used on motor cycles but I claim that my invention comprises an improved simple, complete and effective combination for the purpose specified. In common with other expanding V pulley variable speed devices my gear can be changed without the objectionable noises frequently occurring with other forms of gears, and a large number of speed ratios can be obtained. In addition to those advantages my invention provides a very simple control in that the one lever operates both the clutch and the gear change; the mechanism is fool proof in that the control lever can be moved right from free engine to top gear either when running or when stationary without damage to any part of the mechanism; there is no clicking noise when the engine is running free; and the whole device is more compact than those hitherto in use and can be readily placed on motor cycles which have been constructed with a fixed gear.

In order that my invention may be the better understood I will describe the same with reference to the accompanying drawings in which—

Figure 1 is a side view of the expanding V pulley and casing with portion of the kick starter quadrant broken away and portion of the casing and rings shown in section in order to show the connection between the outside ring and the inside ring.

Fig. 2 is a part plan view and part central horizontal section of same.

Fig. 3 shows side view and plan view of the inner ring.

Fig. 4 is a view showing the outer end of the shank of the nut 4 with the kick starter ratchet device.

Figs. 5 and 6 are side view and plan view showing so much of a motor cycle as is necessary to explain my invention.

Figs. 7 and 8 are side view and front view to a larger scale of the plates or brackets that carry the rear wheel.

Fig. 9 shows sectional side view and plan view of the adjustable spring rod for controlling the movement of the rear wheel.

The driving belt is omitted from all the drawings in order that the other parts may be seen more clearly.

I will first describe the expanding V pulley as fitted to the engine shaft. In the drawing the pulley is shown as closed.

Upon the outer end of the engine shaft 1 is secured a flanged boss 2 upon the inner end of which is fastened the inside flange 3 of the expanding pulley.

The boss 2 with the inside flange 3 is secured to the engine shaft 1 by a cone and a nut 4, the nut having a long turned shank with a square 5 upon its outer end which enables the nut to be screwed up tight.

The outer flange 8 of the expanding pulley projects from a long sleeve 9 which slides over the flanged boss 2 and is allowed a limited longitudinal movement upon the boss but is prevented from moving circumferentially thereon by two or more feathers 11 which are secured to the inner end of the sleeve 9 and project through keyways 12 in the wall of the boss. These feathers 11 also serve to carry a ring 1 slidably fitting inside the said boss and encircling the shank of the nut 4, such ring moving inward and outward with the outer flange 8 of the expanding pulley. The sleeve 9, feathers 11 and ring 13 are held together by setscrews 14.

At the bottom of the V groove between the two flanges of the pulley is a loose ring 15 which is mounted upon ball bearings carried by a steel band encircling the boss 2 which carries the inner flange 3. When the V pulley is closed this ring fits into the opening in the center of the face of the outer flange but when the pulley is wide opened the ring is exposed and takes the belt, thereby forming the free wheel. The central portion of this ring is made with a recess or groove into which the metal fastener or clip of the belt fits as the belt travels around so that the fastener or clip does not strike the ring.

Encircling the shank of the nut 4 and within the annular space between it and the boss 2 is a spiral spring 17 the inner end of which bears against the ring 13 and the outer end of which bears against the inside of a cap 18 which is screwed upon the outer end of the boss 2 and has a central hole through which passes the end of the stem of the nut 4.

The spring 17 tends to close the two flanges of the expanding pulley together.

The outer face of the cap 18 is shaped to form the inner ball race of the main thrust bearing of the engine shaft, the outer race 19 of which thrust bearing is secured by a screw thread to an annular casing 20 forming part of a casing 21 which is held rigidly by pillar bolts 22 to the engine crank case 23. The pillar bolts 22 hold the casing out so that the two flanges of the expanding pulley are at all times exposed.

The casing carries an outside governor ring 25 from which projects a lug 26 to which is secured the control lever 27 whereby the outer flange of the pulley is moved inward and outward. This governor ring is secured, by means of bolts 28 passing through circumferential slots in the casing 21 to an oscillatable inner slotted ring 29, so that when the control lever 27 is operated the governor ring 25 and such inner ring 29 are oscillated together.

Within the oscillatable inner ring 29 is a thrust ring 30 forming the outer race of a thrust bearing the inner race of which bearing is formed by a ring 31 rigidly secured upon the sleeve 9 of the outer flange of the expanding pulley. This last mentioned thrust ring carries several radially projecting pins 34 fitted with rollers 35 which pass through inclined slots in the oscillatable inner ring 29 and through longitudinal slots in the casing 21. The projecting pins 34 are prevented from moving circumferentially by the rollers 35 which fit the longitudinal slots in the casing 21, so that a circumferential movement of the governor ring 25 produces a longitudinal movement of beforementioned thrust ring 30 or race and consequently of the sleeve of the outer flange of the pulley thereby moving the outer flange of the pulley inward or outward. When the race is moved outward the spring 17 is compressed. When moved inward the spring 17 is allowed to expand and move the flange over.

The opening in the inner face of the casing 21 whereby access is had to the interior is fitted with a ring 37 which serves both as an end bearing for the oscillatable inner slotted ring 29 and as a dust proof cover for the working parts.

The working face of both flanges of the expanding pulley are slightly convex so that the lower or inner portions are more nearly parallel than the upper or outer portions.

The upper end of the control lever 27 moves against a notched or perforated arc 39 see Fig. 5 which is fixed to the cycle frame so that the lever can be fixed in any position of the arc.

The end of the elongated nut 4 has applied to it by means of a ratchet 40 a spur wheel 41 which gears through an opening in the outer casing 20 with a kick starter quadrant 42. The spur wheel 41 is mounted upon the end of the nut 4 but is not attached thereto except through the ratchet. The kick starter quadrant 42 is secured upon the end of a foot lever 43 which is pivoted upon one of the pillar bolts which is extended for the purpose. The foot lever 43 is fitted with a spring 44 to hold the quadrant in raised or disengaged position.

I will now describe the method of attaching the rear or driving wheel and adjusting same to take up the slack of the belt produced by the changing of the gear ratio.

The axle 46 of the rear wheel is rigidly secured to two plates 47 one upon each side, which are pivoted at the lower end by bolts 48, one bolt to each plate, to plate-like lugs 49 projecting from and rigidly fastened to the cycle frame.

The upper ends of these plates 47 are connected by a forked adjustable connecting rod 50—51 to the lug 26 which projects from the before mentioned governor ring.

In applying my invention to some patterns of machine it may be necessary to position the adjustable connecting rod 50—51 below the frame bar instead of above it as shown in the drawings. In that case the rear plates 47 would be reversed and would be pivoted at their upper ends to the frame, and the connecting rod would be attached to their lower ends.

The adjustable connecting rod is made in two telescopic parts with an interposed spring. The forward portion is made of a round rod 50 slidable within a straight tubular portion at the forward end of the fork 51 with an annular space for the spring 52 between. The rod 50 slides neatly through two guide rings 53 and 54 secured inside the tubular rear portion one at its forward end and one some little distance back therefrom, the spring being confined between such rear guide ring and a collar 55 secured upon the rod just within the outer end of the tubular portion.

The spring 52 tends to keep the connecting rod expanded. A shortening of the distance between the lug 26 on the governor ring and the rear wheel will compress the spring and shorten the rod thereby loosening the belt and allowing it to slip.

When the control lever 27 is moved forward to increase the effective size of the expanding pulley the upper ends of the plates 47 are pulled forward by the forked connecting rod 50—51, and therefore the rear wheel is pulled slightly forward thereby maintaining an even tension on the belt. When the control lever 27 is set back to decrease the effective size of the driving pulley the rear wheel is moved slightly backward.

When the control lever 27 is in such a position that the flanges of the pulley are disengaged from the belt the plates 47 carrying the rear wheel come against stop cams 57 projecting from the plates 47 so that any further movement of the control lever 27 will not move the rear wheel but will compress the spring 52 in the connecting rod and merely shorten the rod. These stop cams 57 can be set to regulate the backward movement of the plates and consequently of the wheel.

The brake lever 60 is mounted on the governor ring lug 26 thereby causing the brake shoe 61 upon the end of the rod 62 to follow up the wheel rim as the gear ratio is changed and, when it is operated to apply the brake, it tends to draw the rear wheel forward and thereby slacken the belt, allowing it to slip.

In order to carry a speedometer one of the side plates 47 is extended to carry the speedometer pinion which gears with a spur wheel on the rear wheel hub 46.

What I claim is:—

1. In a motor cycle having an expanding V pulley drive:—the means for mounting and moving the rear wheel consisting in mounting the axle in two plates as 47 pivoted at their lower end to the cycle frame and connected at their upper end by a forked adjustable connecting rod to a lug as 26 projecting from the governor ring whereby the V pulley is opened and closed, substantially as described.

2. In a device as claimed in the preceding claim 1:—an adjustable connecting rod connecting the upper ends of the pivoted plates 47 with the governor ring, comprising a rod portion as 50 slidable through two guide rings as 53 and 54 within a straight tubular portion of a forked portion 51 in combination with a spring as 52 encircling the rod 50 and confined between the guide ring 54 and a collar 55 secured upon the outer end of the tubular portion 51, substantially as described and for the purpose set forth.

3. In a motor cycle having an expanding V pulley drive:—a spiral spring as 17 encircling the shank of an elongated nut as 4 secured upon the end of the engine shaft and inclosed within the boss as 9 of the movable flange of the expanding pulley, substantially as described and for the purpose set forth.

4. In a motor-cycle having an expanding V-pulley drive, the fixed flange 3 and slidable flange 8 secured upon their respective sleeves 2 and 9, the spiral spring 17 confined between the cap 18, secured to the sleeve 2, and the ring 13 secured to the sleeve 9 and tending to force the flanges together, in combination with the means for forcing the flanges apart comprising a ball race or ring 31 secured upon the sleeve 9, the oscillatable ring 29 with several curved slots, the governor ring 25 which carries the control lever and is attached by bolts 28 passing through the circumferential slots in the outer casing 21 to the inner ring 29, a ball race or thrust ring 30 carrying several radialy projecting pins 34 fitted with rollers 35 which pass through the inclined slots of the ring 29 and through longitudinal slots in the casing 21, and a ring of balls between the rings 30 and 31, substantially as described.

5. In a motor cycle having an expanding V pulley drive:—the kick starting attachment comprising a quadrant as 42 secured upon the end of a foot lever as 43 pivoted upon one of the pillar bolts whereby the main casing is secured to the cycle frame, and a spur wheel as 41 adapted to be engaged by said quadrant and connected by means of a ratchet as 40 with a cap as 18 secured upon the end of the elongated nut as 4 secured upon the end of the engine shaft, substantially as described.

6. In a motor cycle having an expanding V pulley drive:—a brake lever as 60 mounted on the governor ring lug as 26 whereby the brake shoe is caused to follow up the wheel rim as the gear ratio is changed and, when the lever is operated to apply the brake, drawing the wheel forward and thereby slackening the belt, substantially as described.

In testimony that I claim the foregoing as my invention I have signed my name in the presence of two subscribing witnesses this 8th day of January, 1920.

ALFRED HERMAN TRAEGER.

Witnesses:
ARTHUR GORE COLLISON,
KATHLEEN MARY COLLISON.